US012589996B2

(12) United States Patent
Massonne et al.

(10) Patent No.: US 12,589,996 B2
(45) Date of Patent: Mar. 31, 2026

(54) PROCESS FOR PREPARATION OF CHLORINE FROM HYDROGEN CHLORIDE

(71) Applicant: THE REGENTS OF THE UNIVERSITY OF CALIFORNIA, OAKLAND, Oakland, CA (US)

(72) Inventors: Klemens Massonne, Ludwigshafen am Rhein (DE); Hendrik De Winne, Antwerp (BE); Torsten Mattke, Ludwigshafen am Rhein (DE); Ahmad Dehestani, Walnut Creek, CA (US); Sabine Weiguny, Ludwigshafen am Rhein (DE); Stephan Zuend, Hayward, CA (US); Eric Wesley McFarland, Santa Barbara, CA (US); Behzad Tangeysh, Santa Barbara, CA (US); Shizhao Su, Santa Barbara, CA (US); Sabine Frischhut, Ludwigshafen am Rhein (DE)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 685 days.

(21) Appl. No.: 17/769,400

(22) PCT Filed: Oct. 16, 2020

(86) PCT No.: PCT/EP2020/079217
§ 371 (c)(1),
(2) Date: Apr. 15, 2022

(87) PCT Pub. No.: WO2021/074381
PCT Pub. Date: Apr. 22, 2021

(65) Prior Publication Data
US 2024/0132350 A1      Apr. 25, 2024
US 2024/0228279 A9      Jul. 11, 2024

(30) Foreign Application Priority Data

Oct. 18, 2019    (EP) .................................... 19204114

(51) Int. Cl.
*C01B 7/04*          (2006.01)
*B01J 10/00*         (2006.01)
(Continued)

(52) U.S. Cl.
CPC ............... *C01B 7/04* (2013.01); *B01J 10/005* (2013.01); *B01J 19/02* (2013.01); *B01J 19/2465* (2013.01);
(Continued)

(58) Field of Classification Search
None
See application file for complete search history.

(56) References Cited

U.S. PATENT DOCUMENTS 2,418,930 A      4/1947   Gorin
2,418,931 A *    4/1947   Gorin ........................ C01B 7/04
                                              423/DIG. 12
(Continued)

FOREIGN PATENT DOCUMENTS

CA        2162643 A1     5/1996
JP        s53125989 B    8/1983
KR        20050089821 A  9/2005

OTHER PUBLICATIONS

Su et al "Chlorine Production by HCl oxidation in a molten chloride salt catalyst". Inc. Eng. Chem. Res. 57. 7795-7801. (2018) (Year: 2018).*
(Continued)

*Primary Examiner* — Sheng H Davis
(74) *Attorney, Agent, or Firm* — GATES & COOPER LLP

(57) ABSTRACT

The invention relates to a process for preparation of chlorine from hydrogen chloride comprising circulating a liquid melt
(Continued)

Figure 1:
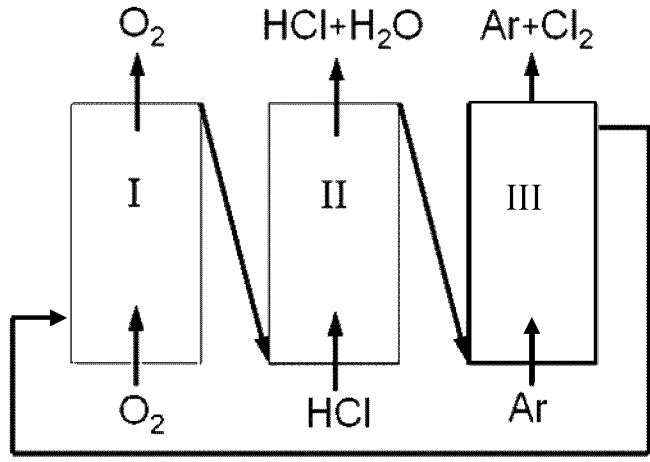

comprising copper ions $Cu^{n+}$ with n being a number in the range from 1 to 2, alkali cations and chloride ions Cl in a reactor system comprising three bubble lift reactors I, II and III, each comprising a reaction zone i, ii and iii respectively, wherein: • (a) in the reaction zone i of the first bubble lift reactor I, a liquid melt comprising copper ions $Cu^{n+}$, alkali cations and chloride ions Cl– is contacted with oxygen at a temperature in the range from 395 to 405° C. so that the molar ratio $Cu^{n+}:Cu^+$ in the liquid melt increases, obtaining a liquid melt having an increased molar ratio $Cu^{n+}:Cu^+$ • (b) the liquid melt obtained in (a) is circulated to the reaction zone ii in the second bubble lift reactor II, where the liquid melt is contacted with hydrogen chloride at a temperature in the range from 395 to 405° C. so that water is formed, obtaining a liquid melt being enriched in chloride anions (Cl–) compared to the liquid melt obtained according to (a); • (c) circulating the liquid melt obtained in (b) to the reaction zone iii in the third bubble lift reactor III, which is operated at a temperature in the range from 420 to 430° C. so that chlorine ($Cl_2$) is formed, wherein $Cl_2$ is removed from the reaction zone iii and the third bubble lift reactor III respectively in gaseous form, leaving a liquid melt depleted of Cl-compared to the liquid melt obtained according to (b). The invention further relates to a reactor system comprising three bubble lift reactors I, II and III.

8 Claims, 3 Drawing Sheets

(51) Int. Cl.
| | |
|---|---|
| *B01J 19/02* | (2006.01) |
| *B01J 19/24* | (2006.01) |
| *B01J 27/08* | (2006.01) |

(52) U.S. Cl.
CPC ........ *B01J 27/08* (2013.01); *B01J 2219/0263* (2013.01)

(56) References Cited

U.S. PATENT DOCUMENTS

| | | | | |
|---|---|---|---|---|
| 4,119,705 A | * | 10/1978 | Riegel | B01J 10/005 |
| | | | | 423/488 |
| 4,329,525 A | | 5/1982 | Riegel | |
| 2004/0115119 A1 | | 6/2004 | Olbert et al. | |

OTHER PUBLICATIONS

Gorin et al. "Chlorination of Methane with Copper Chloride Melts". Industrial and Engineering Chemistry. Nov. 1948. (Year: 1948).*

International Preliminary Report on Patentability received for PCT Patent Application No. PCT/EP2020/079217, mailed on Apr. 28, 2022, 9 pages.

International Search Report and Written Opinion received for PCT Patent Application No. PCT/EP2020/079217, mailed on Dec. 21, 2020, 12 pages.

Su et al., "Chlorine Production by HCI Oxidation in a Molten Chloride Salt Catalyst," Ind. Eng. Chem. Res., vol. 57, No. 23, May 22, 2018, pp. 7795-7801.

Tokmakov Pavel., "Untersuchung zur Chemie des Deacon-Prozesses in Salzschmelzen," Technische Universität Bergakademie Freiberg, May 9, 2018, 176 pages.

Korean Notice of Preliminary Rejection dated Jul. 22, 2025 for Korean Application No. 2022-7016546.

Japanese Office Action dated Oct. 18, 2024 for Japanese Application No. 2022-523149.

* cited by examiner top view top view

PROCESS FOR PREPARATION OF CHLORINE FROM HYDROGEN CHLORIDE

CROSS-REFERENCE TO RELATED APPLICATIONS

This application is a national stage application (under 35 U.S.C. § 371) of PCT/EP2020/079217, filed Oct. 16, 2020, which claims benefit of European Application No. 19204114.3, filed Oct. 18, 2019, both of which are incorporated herein by reference in their entirety.

The invention relates to a process for preparation of chlorine from hydrogen chloride comprising circulating a liquid melt comprising copper ions $Cu^{n+}$ with n being a number in the range from 1 to 2, alkali cations and chloride ions $Cl^-$ in a reactor system comprising three bubble lift reactors I, II and III, each comprising a reaction zone i, ii and iii respectively, wherein: (a) in the reaction zone i of the first bubble lift reactor I, a liquid melt comprising copper ions $Cu^{n+}$, alkali cations and chloride ions $Cl^-$ is contacted with oxygen ($O_2$) at a temperature >375° C. so that the molar ratio $Cu^{2+}:Cu^+$ in the liquid melt increases, obtaining a liquid melt having an increased molar ratio $Cu^{2+}:Cu^+$; (b) the liquid melt obtained in (a) is circulated to the reaction zone ii in the second bubble lift reactor II, where the liquid melt is contacted with hydrogen chloride (HCl) at a temperature >355° C. so that water is formed, obtaining a liquid melt being enriched in chloride anions ($Cl^-$) compared to the liquid melt obtained according to (a); (c) circulating the liquid melt obtained in (b) to the reaction zone iii in the third bubble lift reactor III, which is operated at a temperature in the range from 400 to 480° C. so that chlorine ($Cl_2$) is formed, wherein $Cl_2$ is removed from the reaction zone iii and the third bubble lift reactor III respectively in gaseous form, leaving a liquid melt depleted of $Cl^-$ compared to the liquid melt obtained according to (b).

The invention further relates to a reactor system comprising three bubble lift reactors I, II and III, each bubble lift reactor comprising a reaction zone i, ii, and iii; an outlet for liquid melt in the top region of each bubble lift reactor; and an inlet for liquid melt in the bottom region of each bubble lift reactor, wherein the bubble lift reactors I, II and III are connected by connection lines suitable for circulation of a liquid melt, so that a) the outlet for liquid melt of the first bubble lift reactor I is connected by a connection line to the inlet for liquid melt of the second bubble lift reactor II; b) the outlet for liquid melt of the second bubble lift reactor II is connected by a connection line to the inlet for liquid melt of the third bubble lift reactor III; c) the outlet for liquid melt of the third bubble lift reactor III is connected by a connection line to the inlet for liquid melt of the first bubble lift reactor I.

Furthermore, the invention relates to chlorine obtained or obtainable by the inventive process, to a salt mixture comprising copper ions $Cu^{n+}$ with n being a number in the range from 1 to 2, potassium ions $K^+$ and chloride ions $Cl^-$, wherein the salt mixture has a molar ratio $Cu^{n+}:K^+$ in the range from 1:0.60 to 1:1.45, as well as to these of a salt mixture comprising copper ions $Cu^{n+}$ with n being a number in the range from 1 to 2, potassium ions $K^+$ and chloride ions $Cl^-$, wherein the salt mixture has a molar ratio $Cu^{n+}:K^+$ in the range from 1:0.60 to 1:1.45, for the preparation of chlorine from hydrogen chloride.

Hydrogen chloride (HCl) is a waste product in several industrial processes, such as the preparation of isocyanates. HCl can be converted to chlorine ($Cl_2$) by the so called Deacon process. The $Cl_2$ produced can then be used to manufacture other commercially valuable products, and at the same time the emission of waste hydrochloric acid is curtailed. The Deacon process is based on the gas phase oxidation of hydrogen chloride: $4\ HCl+O_2 \rightarrow 2\ Cl_2+2\ H_2O$, wherein the reaction takes place at about 400 to 450° C. in the presence of a variety of catalysts, including for example copper chloride ($CuCl_2$). The complete process comprises three reactions, i.e. (1) the oxidation of CuCl with oxygen to $Cu_2OCl_2$ ($CuO\cdot CuCl_2$): $2\ CuCl+1/2\ O_2 \rightarrow Cu_2OCl_2$ (oxidation); (2) the reaction of $Cu_2OCl_2$ with gaseous HCl to $CuCl_2$ and water:$Cu_2OCl_2+2\ HCl \rightarrow 2\ CuCl_2+H_2O$ (chlorination); and (3) the thermal decomposition of $CuCl_2$ to give CuCl and $Cl_2$: $2\ CuCl_2 \rightarrow 2\ CuCl+Cl_2$ (dechlorination).

U.S. Pat. No. 2,418,930 A discloses a two-stage Deacon process in molten salts, wherein reaction (1) is conducted in a first stage and reactions (2) and (3) are combined in a second stage.

Su et al. investigated the use of a molten salt mixture containing 45 mol % KCl and 55 mol % $CuCl_2$ as a catalyst for the reaction of HCl with $O_2$ to produce $Cl_2$ in a single reactor consisting of a quartz tube. The HCl conversion was measured at 400° C. and at 450° C. (Su S., Mannini D., Metiu H. Gordon M. J., McFarland E. W., Ind. Eng. Chem. Res. 2018, 57, 7795-7801).

An overview on the Deacon process is given in the dissertation of Pavel Tokmakov (Pavel Tokmakov: "Untersuchung zur Chemie des Deacon-Prozesses in Salzschmelzen", 2018). Tokmakov outlines a two reactor concept as well as a three reactor concept schematically in chapters 6 called "Suggestions for the technology" ("Vorschläge zur Technologie") and concludes that a three reactor concept would be problematic, inter alia in view of energetic aspects. The temperatures disclosed for the three reactions, i.e. the three reactors, are 360-375° C. for the oxidation (1), 355° C. for the chlorination (2) and >480° C. for the dechlorination (3). A circulation of liquid melt is identified as being difficult, inter alia in view of problems to keep the melt liquid. A relatively large effort is suggested to overcome the problems connected with a three reactor concept, i.e. the use of an airlift pump and use of pressure differences are suggested and the temperatures suggested for the individual reactions result in a large temperature difference between the reaction zones U.S. Pat. No. 2,418,931 A discloses a process for production of chlorine from hydrogen chloride, wherein the temperature ranges in the first, second and third zone are of from 200 to 425° C. in the first zone, of from 200 to 475° C. in the second zone, and of from 500 to 800° C. in the third zone.

It was an object of the present invention to provide a novel and advantageous process for the preparation of chlorine from hydrogen chloride, which overcomes the above-mentioned problems, in particular a process, which uses a three reactor concept but overcomes the problem of keeping the melt liquid and circulable while being simpler and more economic than the processes of the prior art. It was a further object of the present invention to provide a reactor system for carrying out the process. It was a further object of the present invention to provide an improved salt mixture comprising copper ions for use in the process for preparation of chlorine from hydrogen chloride, which allows a better space-time-yield than the salt mixtures known from the prior art.

Therefore, the present invention relates to a process for preparation of chlorine from hydrogen chloride comprising circulating a liquid melt comprising copper ions $Cu^{n+}$ with n being a number in the range from 1 to 2, alkali cations and chloride ions Cl⁻ in a reactor system comprising three bubble lift reactors I, II and III, each comprising a reaction zone i, ii and iii respectively, wherein:

(a) in the reaction zone i of the first bubble lift reactor I, a liquid melt comprising copper ions $Cu^{n+}$, alkali cations and chloride ions Cl⁻ is contacted with oxygen ($O_2$) at a temperature >375° C. so that the molar ratio $Cu^{2+}:Cu^+$ in the liquid melt increases, obtaining a liquid melt having an increased molar ratio $Cu^{2+}:Cu^+$;

(b) the liquid melt obtained in (a) is circulated to the reaction zone ii in the second bubble lift reactor II, where the liquid melt is contacted with hydrogen chloride (HCl) at a temperature >355° C. so that water is formed, obtaining a liquid melt being enriched in chloride anions (Cl⁻) compared to the liquid melt obtained according to (a);

(c) circulating the liquid melt obtained in (b) to the reaction zone iii in the third bubble lift reactor III, which is operated at a temperature in the range from 400 to 480° C. so that chlorine ($Cl_2$) is formed, wherein $Cl_2$ is removed from the reaction zone iii and the third bubble lift reactor III respectively in gaseous form, leaving a liquid melt depleted of Cl⁻ compared to the liquid melt obtained according to (b).

Surprisingly, it was found that this process for preparation of chlorine from hydrogen chloride allows an improved space-time-yield regarding $Cl_2$ obtained. Due to the specific temperature ranges used in (a), (b) and (c), especially the specific temperature ranges used in (a) and (c), an improved space-time-yield can be achieved for $Cl_2$ obtained and no means such as airlift pumps and/or pressure differences are required to keep the melt liquid and circulable, thus resulting in an economically advantageous process (smaller temperature differences between the three reaction zones).

The expression "copper ions $Cu^{n+}$ with n being a number in the range from 1 to 2" comprises $Cu^{2+}$ cations and $Cu^{1+}$ cations, wherein n is the sum of the molar amount of $Cu^{2+}$ (m2) in the salt mixture multiplied with the charge 2 and the molar amount of $Cu^{1+}$ (m1) in the salt mixture multiplied with the charge 1, divided by the total molar amount of $Cu^{2+}$ and $Cu^{1+}$ in the salt mixture (molar amount of $Cu^{2+}$ (m1)+ molar amount of $Cu^{1+}$ (m2)):n=[m1×1+m2×2]/[m1+m2].

In one embodiment of the process, the liquid melt depleted of Cl⁻ obtained in (c) is recirculated to (a).

Preferably, a liquid melt comprising copper ions $Cu^{n+}$, alkali cations and chloride ions Cl⁻ with n being a number in the range from 1.5 to 2.0, preferably in the range from 1.8 to 2.0, more preferably in the range from 1.9 to 2.0, more preferably 2, is used as initial liquid melt at the start of the process and the process is started in step (c). The reaction zone iii of the third bubble lift reactor III is operated at a temperature in the range from 400 to 480° C. There, chlorine ($Cl_2$) is formed, wherein $Cl_2$ is removed from the reaction zone iii and the third bubble lift reactor III respectively in gaseous form, leaving a liquid melt depleted of Cl⁻ compared to the initial liquid melt.

Regarding the liquid melt comprising copper ions $Cu^{n+}$, alkali cations and chloride ions Cl⁻, it is preferred that the alkali cation comprises one or more alkali cation(s) selected from the group of lithium cation, sodium cation and potassium cation, and comprises more preferably at least potassium cations. Preferably, the liquid melt comprises $Cu^{n+}$, potassium ions $K^{n+}$ and chloride ions Cl⁻ and is obtained or obtainable from a salt mixture having a molar ratio $Cu^{n+}:K^+$ in the range from 1:0.60 to 1:1.45, preferably in the range from 1:0.60 to 1:1.40, more preferably in the range from 1:0.77 to 1:1.20, more preferably in the range from 1:0.85 to 1:1.11, preferably from a salt mixture comprising $Cu(II)Cl_2$ and KCl. A lower KCl amount enables higher $CuCl_2$ amount, resulting in an improved $Cl_2$-yield for the overall process, i.e. an improved space-time-yield is reached.

According to (a), a liquid melt comprising copper ions $Cu^{n+}$, alkali cations and chloride ions Cl⁻ is contacted in the reaction zone i of the first bubble lift reactor I with oxygen ($O_2$) at a temperature >375° C. so that the molar ratio $Cu^{2+}:Cu^+$ in the liquid melt increases. Preferably, the contacting of the liquid melt comprising copper ions $Cu^{n+}$, alkali cations and chloride Cl⁻ with $O_2$ in (a) is conducted by using a gaseous phase containing oxygen ($O_2$). The wording "the molar ratio $Cu^{2+}:Cu^+$ in the liquid melt increases" according to (a) preferably comprises that $Cu^{2+}$ ions are formed from $Cu^+$ ions due to oxidation of $Cu^+$ by $O_2$. It is preferred that the liquid melt is contacted with $O_2$ in (a) at a temperature ≥378° C., more preferably ≥380° C., more preferably at a temperature in the range from >375 to 480° C., more preferably in the range from 378° C. to 480° C., more preferably in the range from 380° C. to 420° C., more preferably in the range from 390 to 410° C., more preferably in the range from 395 to 405° C.

According to (b), the liquid melt obtained in (a) is circulated to the reaction zone ii in the second bubble lift reactor II, where the liquid melt is contacted with hydrogen chloride (HCl) at a temperature >355° C. The contacting with HCl in (b) is preferably conducted by using a gaseous phase containing hydrogen chloride (HCl). Preferably, the liquid melt is contacted with HCl in (b) at a temperature 358° C., more preferably ≥360° C., more preferably at a temperature in the range from >355 to 420° C., more preferably in the range from 358 to 420° C., more preferably in the range from 360 to 420° C., more preferably in the range from 380 to 420° C., more preferably in the range from 390 to 410° C., more preferably in the range from 395 to 405° C.

According to (c), the liquid melt obtained in (b) is circulated to the reaction zone iii in the third bubble lift reactor III, which is operated at a temperature in the range from 400 to 480° C. so that chlorine ($Cl_2$) is formed, wherein $Cl_2$ is removed from the reaction zone iii and the third bubble lift reactor III respectively in gaseous form. It is preferred that the removal of $Cl_2$ according to (c) is conducted by contacting the liquid melt in (c) with an inert gas, for example argon or nitrogen. Preferably, (c) is conducted at a temperature in the range from 410 to 440° C., preferably in the range from 415 to 435° C., more preferably in the range from 420 to 430° C.

According to a preferred embodiment of the process, the liquid melt is contacted with $O_2$ in (a) at a temperature in the range from >375 to 480° C., preferably in the range from 378° C. to 480° C., more preferably in the range from 380° C. to 420° C., more preferably in the range from 390 to 410° C., more preferably in the range from 395 to 405° C.;

the contacting with HCl in (b), is conducted at a temperature in the range from >355 to 420° C., preferably in the range from 358 to 420° C., more preferably in the range from 360 to 420° C., more preferably in the range from 380 to 420° C., more preferably in the range from 390 to 410° C., more preferably in the range from 395 to 405° C.; and the removal of $Cl_2$ according to (c), which is preferably done by contacting the liquid melt in (c) with an inert gas, for example argon, is conducted at a temperature in the range from 410 to 440° C., preferably in the range from 415 to 435° C., more preferably in the range from 420 to 430° C.

According to a more preferred embodiment of the process, the liquid melt is contacted with $O_2$ in (a) at a temperature in the range from 395 to 405° C., the contacting with HCl in (b), is conducted at a temperature in the range from 395 to 405° C., and the removal of $Cl_2$ according to (c), which is preferably done by contacting the liquid melt in (c) with an inert gas, for example argon, is conducted at a temperature in the range from 420 to 430° C.

Compared to the state of the art, these preferred embodiments result in a small temperature difference (delta T) between the steps (a), (b) and (c), which is in the range of from 35 to 15° C., thus enabling a process with less heating and less cooling needed compared to the prior art processes, which in turn results in energy saving.

It is preferred that the liquid melt is circulated between the bubble lift reactors I, II, and III by connection lines.

Steps (a), (b) and (c) are conducted in batch mode or continuously, preferably continuously.

Steps (a), (b) or (c), preferably at least two of (a), (b) and (c), more preferably (a), (b) and (c) are preferably conducted at a pressure in the range from 800 to 1200 mbar, preferably in the range from 900 to 1100 bar, more preferably in the range from 980 to 1030 mbar, most preferably at normal pressure (1013 mbar).

According to a preferred embodiment of the process, the liquid melt is contacted with $O_2$ in (a) at a temperature in the range from >375 to 480° C., preferably in the range from 378° C. to 480° C., more preferably in the range from 380° C. to 420° C., more preferably in the range from 390 to 410° C., more preferably in the range from 395 to 405° C.;

the contacting with HCl in (b) is conducted at a temperature in the range from >355 to 420° C., preferably in the range from 358 to 420° C., more preferably in the range from 360 to 420° C., more preferably in the range from 380 to 420° C., more preferably in the range from 390 to 410° C., more preferably in the range from 395 to 405° C.; and the removal of $Cl_2$ according to (c), which is preferably done by contacting the liquid melt in (c) with an inert gas, for example argon, is conducted at a temperature in the range from 410 to 440° C., preferably in the range from 415 to 435° C., more preferably in the range from 420 to 430° C.;

wherein (a), (b) or (c), preferably at least two of (a), (b) and (c), more preferably (a), (b) and (c) are conducted at a pressure in the range from 980 to 1030 mbar, most preferably at normal pressure (1013 mbar).

According to a more preferred embodiment of the process, the liquid melt is contacted with $O_2$ in (a) at a temperature in the range from 395 to 405° C., the contacting with HCl in (b) is conducted at a temperature in the range from 395 to 405° C., and the removal of $Cl_2$ according to (c), which is preferably done by contacting the liquid melt in (c) with an inert gas, for example argon, is conducted at a temperature in the range from 420 to 430° C., wherein (a), (b) or (c), preferably at least two of (a), (b) and (c), more preferably (a), (b) and (c) are conducted at a pressure in the range from 980 to 1030 mbar, most preferably at normal pressure (1013 mbar).

Reactor System

Further, the invention relates to a reactor system comprising three bubble lift reactors I, II and III, each bubble lift reactor comprising a reaction zone i, ii, and iii; an outlet for liquid melt in the top region of each bubble lift reactor; and an inlet for liquid melt in the bottom region of each bubble lift reactor, wherein the bubble lift reactors I, II and III are connected by connection lines suitable for circulation of a liquid melt, so that a) the outlet for liquid melt of the first bubble lift reactor I is connected by a connection line to the inlet for liquid melt of the second bubble lift reactor II;

b) the outlet for liquid melt of the second bubble lift reactor II is connected by a connection line to the inlet for liquid melt of the third bubble lift reactor III;

c) the outlet for liquid melt of the third bubble lift reactor III is connected by a connection line to the inlet for liquid melt of the first bubble lift reactor I.

Preferably, one outlet for liquid melt is higher (in vertical direction) arranged than the remaining two other outlets for liquid melt, preferably one outlet for liquid melt is 5 to 10 mm higher (in vertical direction) arranged than the remaining two other outlets for liquid melt.

The "top region of a reactor" means the upper part of a reactor starting from the (horizontal) middle of the reactor including the reactor's sides in said upper part and the top of the reactor; bottom region of a reactor means the lower part of a reactor starting from the (horizontal) middle of the reactor including the reactor's sides in said lower part and the bottom of the reactor.

In one embodiment of the reactor system, at least a part of each of the three bubble lift reactors is surrounded by and in heat-transferring-contact with an individual heating system. Preferably, the individual heating system surrounds at least the lower part of each bubble lift reactor and preferably also surrounds parts of the connection lines and the respective inlet for liquid melt. In one embodiment, the individual heating system is a furnace.

In one embodiment of the reactor system, at least 20 volume-%, preferably at least 25 volume-%, more preferably at least 30 volume-%, more preferably between 30 and 50 volume-%, of the reactor system, preferably parts of the upper parts of the three bubble lift reactors, are embedded by and in heat-transferring-contact with a heating medium, wherein the heating medium preferably comprises heating means. More preferably, the heating medium surrounds at least a part of the upper part of each bubble lift reactor, where the outlet of liquid melt is located, and parts of the connection lines between the reactors. In one embodiment, the heating medium is a sand bath and the heating means are at least one heating band. Preferably, the at least one heating band is embedded in the sand bath and surrounds the reactors. Preferably, the heating medium has a temperature in the range of from 370 to 430° C., preferably in the range of from 380 to 420° C., more preferred in the range of from 390 to 410° C., more preferred in the range of from 395 to 405° C.

The embedding of the reactor system, preferably of at least parts of the upper parts of the three bubble lift reactors and their outlets for liquid melt as well as part of the connection lines, in a heating medium is advantageous since it allows to reduce temperature differences between the interior and the exterior of the reactor system, for example, the connection lines between the three reactors, thus improving the flowability of the liquid melt in the connection lines. Consequently, the embedding in a heating medium helps avoid the need for means such as airlift pumps and/or pressure differences to keep the melt liquid and circulable, thus resulting in an economically advantageous process.

Preferably, each bubble lift reactor comprises a bubble lift column and has a gas inlet and a gas outlet in the top region of the bubble lift reactor. The gas inlet is build in that the inlet is situated in the reactor top region, wherein a tube extends from the inlet at the top within the reactor towards the bottom of the reactor and is build so that the supplied gaseous phase can be deliberated in the reactor's bottom region.

Preferably, at least 90 volume-% of the reactor system are surrounded by the individual heating systems and the heating medium so that the lower part of each bubble lift reactor and parts of the connection lines and the respective inlets for liquid melt are surrounded by the individual heating system and at least parts of the upper parts of the three bubble lift reactors and their outlets for liquid melt as well as the (remaining) part of the connection lines are surrounded by the heating medium. In this preferred embodiment, only the top region of each bubble lift reactor, where the gas inlet and a gas outlet is located, is free of heating means.

It is preferred that each bubble lift reactor is made from a material independently selected from the group of quartz and ceramic, wherein the ceramic is preferably selected from the group of silicon carbide (SiC), magnesium spinel oxide (Mg spinel oxide), Mg—$ZrO_2$, especially magnesia partially stabilized zirconia (Mg-PSZ) and Y—$ZrO_2$, especially yttria-stabilised tetragonal zirconia polycrystal (Y-TZP); more preferably at least one of the three bubble lift reactors is made of quartz, more preferably all three bubble lift reactors are made of quartz.

The present invention further relates to chlorine obtained or obtainable by the process for preparation of chlorine from hydrogen chloride described above.

Yet further, the invention relates to a salt mixture comprising copper ions $Cu^{n+}$ with n being a number in the range from 1 to 2, potassium ions $K^+$ and chloride ions $Cl^-$, wherein the salt mixture has a molar ratio $Cu^{n+}$:$K^+$ in the range from 1:0.60 to 1:1.45, preferably in the range from 1:0.60 to 1:1.40, more preferably in the range from 1:0.77 to 1:1.20, more preferably in the range from 1:0.85 to 1:1.11, preferably for use in the preparation of chlorine from hydrogen chloride, more preferably for use in the preparation of chlorine from hydrogen chloride with $CuCl_2$ as catalyst, more preferably for use in the preparation of chlorine from hydrogen chloride with $CuCl_2$ as catalyst in a reactor system as described above.

Yet further, the invention relates to the use of a salt mixture comprising copper ions $Cu^{n+}$ with n being a number in the range from 1 to 2, potassium ions $K^+$ and chloride ions $Cl^-$, wherein the salt mixture has a molar ratio $Cu^{n+}$:$K^+$ in the range from 1:0.60 to 1:1.45, preferably in the range from 1:0.60 to 1:1.40, more preferably in the range from 1:0.77 to 1:1.20, more preferably in the range from 1:0.85 to 1:1.11, for the preparation of chlorine from hydrogen chloride, preferably for the preparation of chlorine from hydrogen chloride with $CuCl_2$ as catalyst, more preferably for use in the preparation of chlorine from hydrogen chloride with $CuCl_2$ as catalyst in a reactor system as described above.

The present invention is further illustrated by the following embodiments and combinations of embodiments as indicated by the respective dependencies and back-references. In particular, it is noted that in each instance where a range of embodiments is mentioned, for example in the context of a term such as "The process of any of embodiments 1 to 4", every embodiment in this range is meant to be explicitly disclosed for the skilled person, i.e. the wording of this term is to be understood by the skilled person as being synonymous to "The process of any of embodiments 1, 2, 3, and 4". Further, it is explicitly noted that the following set of embodiments is not the set of claims determining the extent of protection, but represents a suitably structured part of the description directed to general and preferred aspects of the present invention.

1. A process for preparation of chlorine from hydrogen chloride comprising circulating a liquid melt comprising copper ions $Cu^{n+}$ with n being a number in the range from 1 to 2, alkali cations and chloride ions $Cl^-$ in a reactor system comprising three bubble lift reactors I, II and III, each comprising a reaction zone i, ii and iii respectively, wherein:
   (a) in the reaction zone i of the first bubble lift reactor I, a liquid melt comprising copper ions $Cu^{n+}$, alkali cations and chloride ions $Cl^-$ is contacted with oxygen ($O_2$) at a temperature >375° C. so that the molar ratio $Cu^{2+}$:$Cu^+$ in the liquid melt increases, obtaining a liquid melt having an increased molar ratio $Cu^{2+}$:$Cu^+$;
   (b) the liquid melt obtained in (a) is circulated to the reaction zone ii in the second bubble lift reactor II, where the liquid melt is contacted with hydrogen chloride (HCl) at a temperature >355° C. so that water is formed, obtaining a liquid melt being enriched in chloride anions ($Cl^-$) compared to the liquid melt obtained according to (a);
   (c) circulating the liquid melt obtained in (b) to the reaction zone iii in the third bubble lift reactor III, which is operated at a temperature in the range from 400 to 480° C. so that chlorine ($Cl_2$) is formed, wherein $Cl_2$ is removed from the reaction zone iii and the third bubble lift reactor III respectively in gaseous form, leaving a liquid melt depleted of $Cl^-$ compared to the liquid melt obtained according to (b).

2. The process of embodiment 1, wherein the liquid melt depleted of $Cl^-$ obtained in (c) is recirculated to (a).

3. The process of embodiment 1 or 2, wherein a liquid melt comprising copper ions $Cu^{n+}$, alkali cations and chloride ions $Cl^-$ with n being a number in the range from 1.5 to 2, preferably in the range from 1.8 to 2.0, more preferably in the range from 1.9 to 2.0, more preferably 2, is used as initial liquid melt at the start of the process and the process is started in step (c).

4. The process of any one of embodiments 1 to 3, wherein the liquid melt comprising copper ions $Cu^{n+}$, alkali cations and chloride ions $Cl^-$ comprises as alkali cations one or more alkali cation(s) selected from the group of lithium cation, sodium cation and potassium cation, and comprises more preferably at least potassium cations.

5. The process of embodiment 4, wherein the liquid melt comprises $Cu^{n+}$, potassium ions $K^+$ and chloride ions $Cl^-$ and is obtained or obtainable from a salt mixture having a molar ratio $Cu^{n+}$:$K^+$ in the range from 1:0.60 to 1:1.45, preferably in the range from 1:0.60 to 1:1.40, more preferably in the range from 1:0.77 to 1:1.20, more preferably in the range from 1:0.85 to 1:1.11, preferably from a salt mixture comprising $Cu(II)Cl_2$ and KCl.

6. The process of any one of embodiments 1 to 5, wherein the liquid melt is contacted with $O_2$ in (a) at a temperature ≥378° C., preferably ≥380° C., more preferably at a temperature in the range from >375 to 480° C., more preferably in the range from 378° C. to 480° C., more preferably in the range from 380° C. to 420° C., more preferably in the range from 390 to 410° C., more preferably in the range from 395 to 405° C.

7. The process of any one of embodiments 1 to 6, wherein the liquid melt is contacted with HCl in (b) at a temperature 358° C., preferably ≥360° C., more preferably at a temperature in the range from >355 to 420° C., more preferably in the range from 358 to 420° C., more preferably in the range from 360 to 420° C., more preferably in the range from 380 to 420° C., more preferably in the range from 390 to 410° C., more preferably in the range from 395 to 405° C.

8. The process of any one of embodiments 1 to 7, wherein (c) is conducted at a temperature in the range from 410 to 440° C., preferably in the range from 415 to 435° C., more preferably in the range from 420 to 430° C.

9. The process of any one of embodiments 1 to 8, wherein the liquid melt is circulated between the bubble lift reactors I, II, and III by connection lines.

10. The process of any one of embodiments 1 to 9, wherein (a), (b) and (c) are conducted in batch mode or continuously, preferably continuously.

11. The process of any one of embodiments 1 to 10, wherein (a), (b) or (c), preferably at least two of (a), (b) and (c), more preferably (a), (b) and (c) are conducted at a pressure in the range from 800 to 1200 mbar, preferably in the range from 900 to 1100 bar, more preferably in the range from 980 to 1030 mbar, most preferably at normal pressure (1013 mbar).

12. A reactor system comprising three bubble lift reactors I, II and III, each bubble lift reactor comprising a reaction zone i, ii, and iii respectively; an outlet for liquid melt in the top region of each bubble lift reactor; and an inlet for liquid melt in the bottom region of each bubble lift reactor, wherein the bubble lift reactors I, II and III are connected by connection lines suitable for circulation of a liquid melt, so that d) the outlet for liquid melt of the first bubble lift reactor I is connected by a connection line to the inlet for liquid melt of the second bubble lift reactor II;

e) the outlet for liquid melt of the second bubble lift reactor II is connected by a connection line to the inlet for liquid melt of the third bubble lift reactor III;

f) the outlet for liquid melt of the third bubble lift reactor III is connected by a connection line to the inlet for liquid melt of the first bubble lift reactor I.

13. The reactor system of embodiment 12, wherein one outlet for liquid melt is higher (in vertical direction) arranged than the remaining two other outlets for liquid melt, preferably one outlet for liquid melt is 5 to 10 mm higher (in vertical direction) arranged than the remaining two other outlets for liquid melt.

14. The reactor system of embodiment 12 or 13, wherein at least a part of each of the three bubble lift reactors is surrounded by and in heat-transferring-contact with an individual heating system.

15. The reactor system of any one of embodiments 12 to 14, wherein at least 20 volume-%, preferably at least 25 volume-%, more preferably at least 30 volume-%, more preferably between 30 and 50 volume-%, of the reactor system, preferably at least parts of the three bubble lift reactors and their outlets for liquid melt and optionally parts of the connection lines, are embedded by and in heat-transferring-contact with a heating medium, wherein the heating medium preferably comprises heating means.

16. The reactor system of any one of embodiments 12 to 15, wherein each bubble lift reactor comprises a bubble lift column and has a gas inlet and a gas outlet in the top region of the bubble lift reactor.

17. The reactor system of any one of embodiments 12 to 16, wherein each bubble lift reactor is made from a material independently selected from the group of quartz and ceramic, wherein the ceramic is preferably selected from the group of silicon carbide (SiC), magnesium spinel oxide (Mg spinel oxide), Mg—ZrO$_2$, especially magnesia partially stabilized zirconia (Mg-PSZ) and Y—ZrO$_2$, especially yttria-stabilized tetragonal zirconia polycrystal (Y-TZP); more preferably at least one of the three bubble lift reactors is made of quartz, more preferably all three bubble lift reactors are made of quartz.

18. Chlorine obtained or obtainable by the process of any one of embodiments 1 to 11.

19. A salt mixture comprising copper ions $Cu^{n+}$ with n being a number in the range from 1 to 2, potassium ions $K^+$ and chloride ions $Cl^-$, wherein the salt mixture has a molar ratio $Cu^{n+}:K^+$ in the range from 1:0.60 to 1:1.45, preferably in the range from 1:0.60 to 1:1.40, more preferably in the range from 1:0.77 to 1:1.20, more preferably in the range from 1:0.85 to 1:1.11, preferably for use in the preparation of chlorine from hydrogen chloride, more preferably for use in the preparation of chlorine from hydrogen chloride with $CuCl_2$ as catalyst, more preferably for use in the preparation of chlorine from hydrogen chloride with $CuCl_2$ as catalyst in a reactor system according to any one of embodiments 12 to 16.

20. Use of a salt mixture comprising copper ions $Cu^{n+}$ with n being a number in the range from 1 to 2, potassium ions $K^+$ and chloride ions $Cl^-$, wherein the salt mixture has a molar ratio $Cu^{n+}:K^+$ in the range from 1:0.60 to 1:1.45, preferably in the range from 1:0.60 to 1:1.40, more preferably in the range from 1:0.77 to 1:1.20, more preferably in the range from 1:0.85 to 1:1.11, for the preparation of chlorine from hydrogen chloride, preferably for the preparation of chlorine from hydrogen chloride with $CuCl_2$ as catalyst, more preferably for use in the preparation of chlorine from hydrogen chloride with $CuCl_2$ as catalyst in a reactor system according to any one of embodiments 12 to 16.

The present invention is further illustrated by the following reference examples, comparative examples, and examples.

EXAMPLES

| Chemicals | | |
|---|---|---|
| Name | Chemical composition | Details |
| Copper(II)chloride | CuCl$_2$ | Anhydrous, purity 97 weight-% |
| Copper(I)chloride | CuCl | Anhydrous, purity 98+ weight-% |
| Copper(II)oxide | CuO | Anhydrous, purity 99+ weight-% |
| Potassium chloride | KCl | 99 weight-% extra pure (anhydrous) |
| Hydrogen chloride | HCl | gaseous HCl (HCl(g)) was prepared from liquid HCl by Argon stripping; gaseous HCl(g) stream contained Argon in the range from 70 to 90 weight-% |
| Oxygen | O$_2$ | Air gas UHP300 |
| Argon | Ar | ultra high pure argon, purity 99.999 weight-% |
| Nitrogen | N$_2$ | ultra high pure nitrogen, purity 99.999 weight-% |

Analytics

Chlorine ($Cl_2$) content was determined in that the exhaust gas from the respective reactor (Reference Example 1) or from the reactor system (Reference Example 2), taken from the gas outlet of bubble lift reactor III, was conducted over a frit into an erlenmeyer flask containing 1.0 I water and 20 ml aqueous $NaNO_3$ solution (5 M). The chloride content in the solution was continuously measured by an ISE (ion-selective electrode, company Cole-Parmer).

Reference Example 1: Reactor for Testing Single Reaction Steps (Set-Up 1)

A cylindrical reactor with a gas inlet tube (gas inlet), both made from quartz, was used. The gas inlet was build in that the inlet was situated in the reactor top region, wherein a tube extends from the inlet at the top within the reactor towards the bottom of the reactor and was build so that the supplied gaseous phase could be deliberated in the reactor's bottom region. A gas outlet was at the reactor's head.

The reactor was filled with the respective salt mixture as indicated hereinbelow. Then, the gas inlet was placed so that its opening was situated about 1 cm above the salt mixture. Ar flow was initiated and the temperature was increased to melt the salt mixture. Then, the respective gas inlet tube was lowered into the liquid melt.

Reference Example 2: Reactor System for 3-Stage Continuous Test (Set-Up 2)

Figure 2:
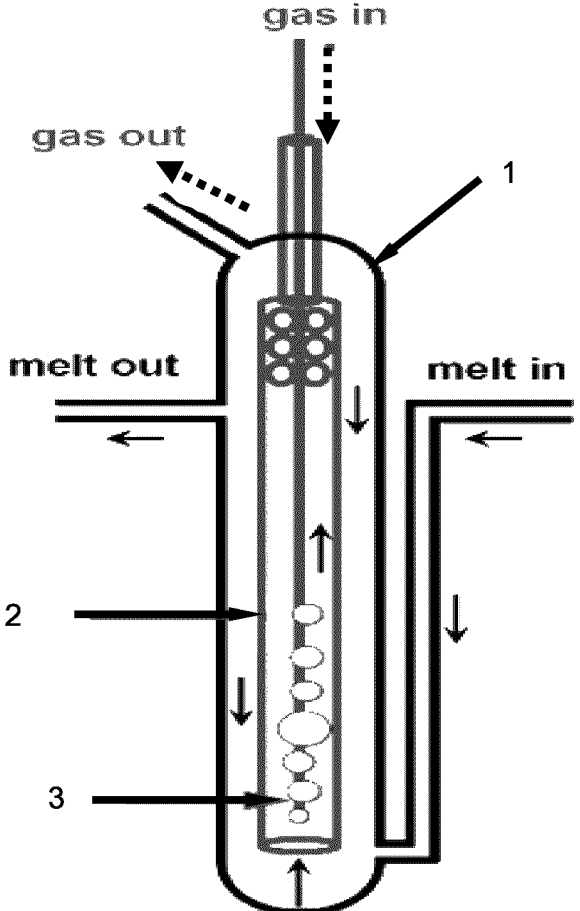

The reactor system included three individual bubble lift reactors I, II and III—in use, each bubble lift reactor contained molten Cu salt species (the liquid melt comprising copper ions $Cu^{n+}$ with n being a number in the range from 1 to 2, potassium ions $K^+$ and chloride ions $Cl^-$) that circulated in and between the bubble lift reactors continuously, and the system could feed as well as remove individual gases in and from the single reactors (as shown in FIG. 1). All bubble lift reactors were made from quartz, had an inner diameter of 22 mm and a length of 400 mm. In the following, "bubble lift reactor" is abbreviated as "reactor". The single reactor set-up is schematically shown in FIG. 2.

Figure 3:
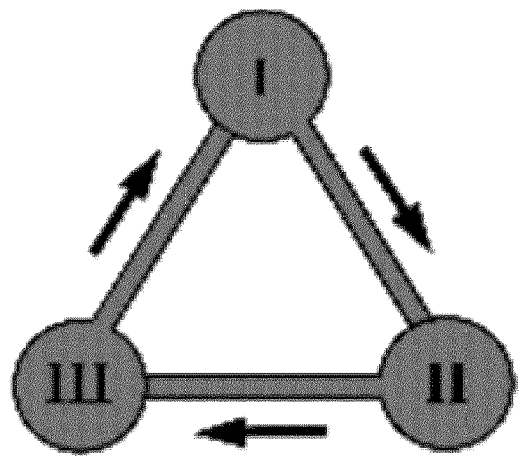
Figure 4:
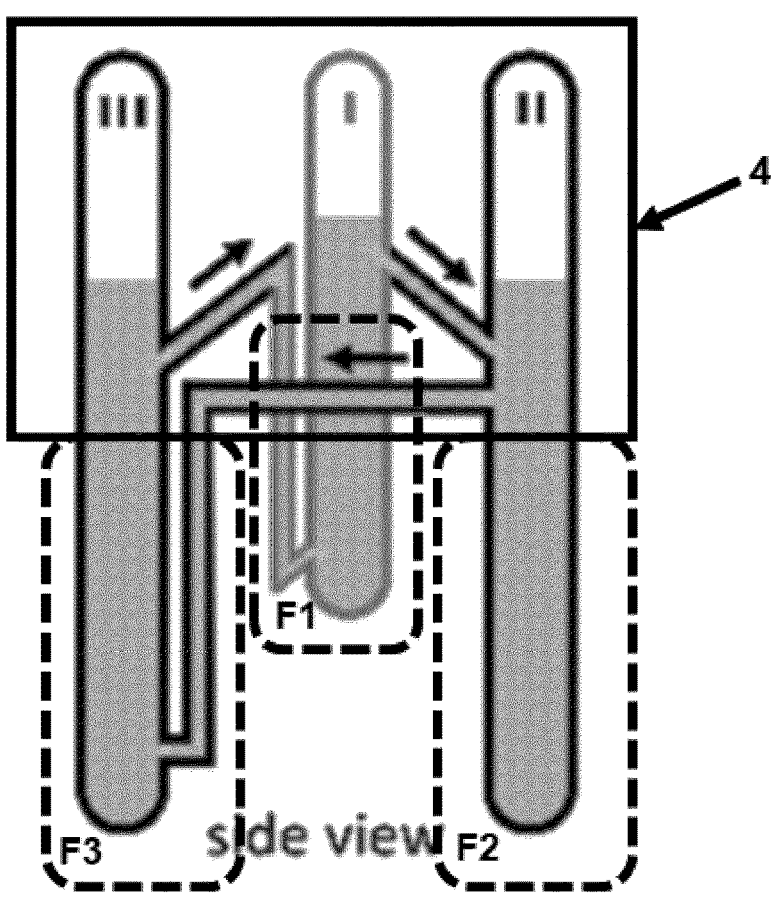

The three individual reactors I, II and III were connected with each other by connection lines which enable the melt circulation between the reactors. Each reactor had an outlet for liquid melt and an inlet for liquid melt. The outlet for liquid melt of one reactor was located in its top region, leading by a connection line to an inlet for liquid melt in the bottom region of the next reactor (as shown in FIG. 1; in FIG. 1 gas inlets and gas outlets in the respective reactor are represented by simple arrows. FIG. 3 shows a schematic top view of the reactor system, FIG. 4 is a schematic side view of the reactor system.)

In detail, the outlet for liquid melt of reactor I, located in the top region of reactor I, was connected by a connection line to an inlet for liquid melt in the bottom region of reactor II; an outlet for liquid melt in the top region of reactor II was then connected by a connection line to an inlet for liquid melt in the bottom region of reactor III; and an outlet for liquid melt in the top region of reactor III was then connected with an inlet for liquid melt in the bottom region of reactor I by a connection line.

All three reactors I, II and III had further inlets suitable for gas supply (gas inlet) in their top regions, and outlets suitable for letting out gaseous components (gas outlet), in their reactor head. The gas inlet was a tube with a diameter of 2 mm.

The gas inlets for gas supply were built in that an inlet was situated in the reactor top region, wherein a tube extends from the inlet at the top within the reactor towards the bottom of the reactor and was built so that the supplied gaseous phase could be deliberated in the reactor's bottom region. All three reactors were separately heated by furnaces, so that for each reactor, the temperature was separately adjusted.

Figure 5:
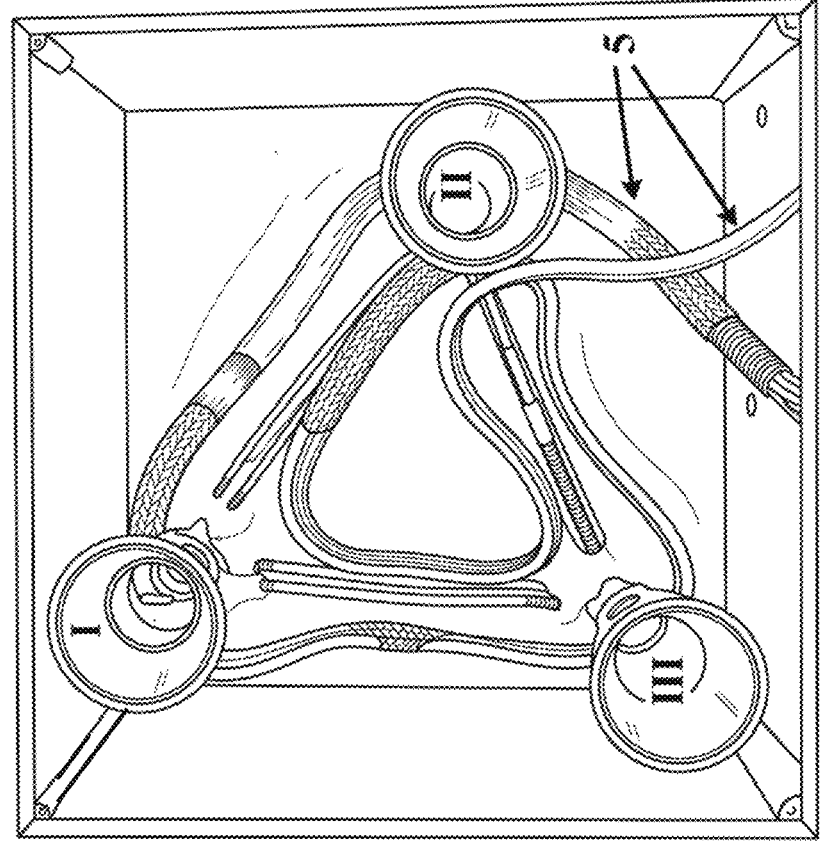

The outlets for liquid melt, the inlets for liquid melt and all connecting lines between the three reactors and all parts above the furnaces of all three reactors were placed inside the same heating medium, a sand bath, heated by heating bands (as shown in FIG. 5). In FIG. 4, the heating medium (sand bath) is indicated by a square in the upper region and the individual heating systems (furnaces) are indicated by squares in the lower region of each reactor (F1 for reactor I, F2 for reactor II, F3 for reactor III).

In use, all three reactors were arranged at the same height, and all inlets for liquid melt were at the same height. For one reactor the outlet for liquid melt was situated between 5 to 10 mm higher than the outlets for liquid melt of the two remaining reactors in order to improve the flow between reactors (not shown).

Example 1: $CuCl_2$ Thermal Decomposition in a Small-Scale Reactor (Exemplarily to Reaction in Reactor III According to Reference Example 2)

The $CuCl_2$ thermal decomposition reaction was measured in a reactor as described in Reference Example 1 (Setup-1). The reactor had an inner diameter of 9 mm and a length of 300 mm; two different gas inlet tubes were used: one was a ceramic tube with 4 bores and an inner diameter of 0.5 mm; the other was a quartz inlet tube with an inner diameter of 2 mm, that was heat-treated to decrease the outlet diameter.

The salt mixture had a composition of 36 weight-% anhydrous potassium chloride (KCl) and 64 weight-% anhydrous copper(II)chloride ($CuCl_2$). 15 grams of the salt mixture were heated to 370° C. in the reactor to form a molten salt ("molten salt" synonymous with "liquid melt") and then further to the reaction temperature. The height of the molten salt was 9 cm. 15 sccm (sccm=standard cubic centimeters per minute) of Ar were bubbled through the molten salt. The chlorine production rate was measured with a chloride ISE probe. Using the ceramic tube with 4 bores and an inner diameter of 0.5 mm, the volumetric rate of $Cl_2$ production was 0.175 $mol/m^3 \cdot s$ at 450° C. Using the quartz inlet tube with an inner diameter of 2 mm, that was heat-treated to decrease the outlet diameter the volumetric rate of $Cl_2$ production was approximately 0.03 $mol/m^3 \cdot s$ at 395° C.

Example 2: CuCl Oxidation Reaction (Exemplarily to Reaction in Reactor I According to Reference Example 2)

The reactor had an inner diameter of 9 mm and a length of 300 mm, wherein the reactor setup was as described in Reference Example 1 (Set up 1). The salt mixture had a composition of 28 weight-% anhydrous potassium chloride (KCl) and 72 weight-% anhydrous copper(I) chloride (CuCl). 20 grams of the mixed salt was heated to 350° C. to form a liquid melt. The height of the molten salt was 15 cm. A gas mixture of 9 sccm of $O_2$ and 1 sccm Ar was bubbled through the molten salt via a quartz tube with 2 mm inner diameter. The oxygen conversion was 29% at 380° C. When a gas mixture of 16 sccm of $O_2$ and 4 sccm Ar was bubbled through the molten salt via a quartz tube with 2 mm inner diameter, the oxygen conversion was 22% at 360° C. and 14% at 400° C.

Example 3: Chlorination Reaction (Exemplarily to Reaction in Reactor II According to Reference Example 2)

The salt mixture used in the chlorination experiment had a composition of 24 weight-% anhydrous potassium chloride (KCl), 66 weight-% anhydrous copper(II)chloride (CuCl$_2$), and 10 weight-% of anhydrous copper(II)oxide (CuO). The reactor had an inner diameter of 9 mm and a length of 300 mm. The gas inlet tube had an inner diameter of 2 mm. The reactor setup was as described in Set up 1. When the salt mixture was heated to 350° C., KCl and CuCl$_2$ formed a liquid melt. A gas mixture of 20 sccm of O$_2$ and 3 sccm of HCl was bubbled through the molten salt. The HCl conversion was 97% at 360° C. and 94% at 380° C., measured by a chloride ISE probe.

Example 4: Cyclic Reaction in a Reactor System

The reactor system included three individual bubble lift reactors I, II and III, wherein the reactor system setup was as described in Reference Example 2 (Set-up 2).

For reactor III T=425° C. was set as a working temperature. For reactors I and II, the temperature was set as T=400° C. The temperatures indicated for reactors I, II and III were the temperatures within the reaction zones i, ii, iii. The temperatures were measured in the interior of the furnace approximately halfway between top and bottom of each reactor. The distance between the temperature probe and reactor wall containing the molten salt was 1-2 mm. Thermocouples of the OMEGA-Quick Disconnect type were used. The T error was estimated to be +/−0.1° C.

Start-Up Stage 36 weight-% anhydrous potassium chloride (KCl) and 64 weight-% anhydrous copper(II)chloride (CuCl$_2$) were mixed to give a salt mixture. The salt mixture was introduced into the empty reactors (tight packing in order to avoid formation of gas bubbles). The reactors were closed so that the gas inlet tube ends were situated about 1 mm above the salt mixture. Argon flow was initiated in reactor III. The temperature was increased within the reactors in 100° C. steps each 20 to 30 minutes, the working temperature in each reactor was reached after 1 to 2 hours and the salts were molten. At the working temperature, the gas inlet tubes were lowered into the liquid melt, approximately until a distance of 30 mm remains between the tube end and the bottom of the reactor. The O$_2$ flow and HCl/Arflow were started just before the gas inlet tubes were inserted into reactors I and II.

The pressure in the reactor system was 1 atm (1013 mbar, system open to atmosphere). The gas flow rates for O$_2$, HCl, Ar were set to 240 ml/min each. In case of HCl, this was generated in situ by bubbling 240 ml/min Argon through a concentrated aqueous HCl solution (360 ml).

Normal-Run Stage

Compared to the three individual reactors of Examples 1 to 3, the temperatures for the cyclic reaction comprising all three reactions were chosen so that an optimum was achieved in view of Cl$_2$ deliberation, which increases with temperature increase, CuCl$_2$ vaporization, which also increases with temperature increase, and a small as possible temperature difference between the reaction zones. Thus, in operation, reactor III had a temperature of T=425° C., in reactors I and II, the temperature was set to T=400° C. O$_2$ was supplied to reactor I through the gas inlet at a flow rate of 240 ml/min, wherein a gaseous stream containing O$_2$ was removed from the gas outlet of reactor I. HCl was supplied to reactor II and a gaseous stream was removed through the gas outlet of reactor II containing HCl and water. Gaseous Ar was fed to reactor III at a flow rate of 240 ml/min; a gaseous stream containing Ar and Cl$_2$ left the reactor III through the gas outlet and was transferred to a connected erlenmeyer flask containing 1.0 I water and 20 ml aqueous NaNO$_3$ solution (5 M) for analysis.

During the time on stream of approximately 5 hours, Cl$_2$ was continuously formed. Thus, it could be shown that the inventive process wherein the liquid melt is contacted with O$_2$ at a temperature >375° C. in a step (a) in the reaction zone i in the first bubble lift reactor I; the liquid melt obtained in (a) is circulated to the reaction zone ii in the second bubble lift reactor II, where the liquid melt is contacted with hydrogen chloride (HCl) at a temperature >355° C. in a step (b); and the liquid melt obtained in (b) is circulated to the reaction zone iii in the third bubble lift reactor Ill, which is operated at a temperature in the range from 400 to 480° C. in a step (c) is an advantageous process, which is also a promising candidate for an economic industrial process.

SHORT DESCRIPTION OF FIGURES

FIG. 1 shows the reactor system including three individual reactors I, II and III. In use, each reactor contained molten Cu salt species that circulate in the reactors continuously. Inlets and outlets for liquid melt and thus for melt circulation as well as the respective connection lines are indicated by arrows at the sides and between the reactors; gas inlets and gas outlets for gaseous components entering and leaving the reactors are indicated schematically at the bottoms and tops of the reactors. The reaction zones i, ii and iii in each reactor are not shown.

FIG. 2 shows the build-up of all single reactors I, II and III in more detail, exemplarily for one reactor. The reactor design comprises three parts: main reactor (1), insert column (2), and an inlet tube (3) for delivering the gas-phase reagents in the reactor system. The main reactor (1) is equipped with a glass joint top with a gas inlet and a gas outlet for feeding and removing the gaseous reagents and products, as well as an inlet for liquid melt and an outlet for liquid melt (circulation). The insert column (2) separates the regions exposed to the gas bubbles, and lets the liquid flow back into the main reactor from the holes embedded on the top. The black arrows (→) in FIG. 2 show the melt direction in a single reactor, i.e. in a single bubble lift column. The dotted arrows indicate the direction of the gas flow.

FIG. 3 shows a schematic top view of the reactor system, wherein the flow direction of the circulating melt is indicated by arrows.

FIG. 4 shows a schematic side view of the reactor system, wherein the flow direction of the circulating melt is indicated by arrows. All three reactors I, II and III were placed in a heating medium system so that the top region of each reactor is embedded in the heating medium, wherein the outlets for liquid melt and at least a part of the connection lines are situated within the heating medium (4). All three reactors are further equipped with individual heating systems (F1, F2, F3), such as furnaces, so that a part of the bottom region of each reactor is surrounded by and in heat-transfer-contact with its individual heating system. As shown in FIG. 4, each individual heating system (F1, F2, F3) surrounds at least the part of each reactor's bottom region where the inlet for liquid melt is located. Preferably, for one reactor the outlet for liquid melt is situated between 5 to 10 mm higher than the outlets for liquid melt of the two remaining reactors in order to improve the flow between the reactors (not shown). The arrows at the top of each reactor indicate gas flow in and gas flow out.

FIG. 5 shows the arrangement of the upper parts of the three bubble lift reactors in the heating medium—here a sand bath. The top region of all three reactors are surrounded in the sand bath, so that the outlets for liquid melt and at least a part of the connection lines are within the sand bath. Heating bands (5) were wrapped in a large, horizontal triangle around the exterior of the connection lines and again in a smaller, horizontal triangle on the interior of the connecting line.

REFERENCE NUMBERS

1 main reactor
2 insert column
3 inlet tube
4 heating medium/sand bath
5 heating band(s)
F1, F2, F3 individual heating systems/furnaces

CITED LITERATURE

U.S. Pat. No. 2,418,930
Su S. et al., Ind. Eng. Chem. Res. 2018, 57, 7795-7801
Dissertation of Pavel Tokmakov: "Untersuchung zur Chemie des Deacon-Prozesses in Salzschmelzen", 2018
U.S. Pat. No. 2,418,931 A

The invention claimed is:

1. A process for preparation of chlorine from hydrogen chloride comprising circulating a liquid melt comprising copper ions $Cu^{n+}$ with n being a number in the range from 1 to 2, alkali cations and chloride ions Cl-in a reactor system comprising three bubble lift reactors I, II and III, each comprising a reaction zone i, ii and iii respectively, wherein:

(a) in the reaction zone i of the first bubble lift reactor I, a liquid melt comprising copper ions $Cu^{n+}$, alkali cations and chloride ions $Cl^-$ is contacted with oxygen ($O_2$) at a temperature in the range from 395 to 405° C. so that the molar ratio $Cu^{2+}:Cu^+$ in the liquid melt increases, obtaining a liquid melt having an increased molar ratio $Cu^{2+}:Cu^+$ (b) the liquid melt obtained in (a) is circulated to the reaction zone ii in the second bubble lift reactor II, where the liquid melt is contacted with hydrogen chloride (HCl) at a temperature in the range from 395 to 405° C. so that water is formed, obtaining a liquid melt being enriched in chloride anions ($Cl^-$) compared to the liquid melt obtained according to (a);

(c) circulating the liquid melt obtained in (b) to the reaction zone iii in the third bubble lift reactor III, which is operated at a temperature in the range from 420 to 430° C. so that chlorine (Ch) is formed, wherein $Cl_2$ is removed from the reaction zone iii and the third bubble lift reactor III respectively in gaseous form, leaving a liquid melt depleted of $Cl^-$ compared to the liquid melt obtained according to (b).

2. The process of claim 1, wherein the liquid melt depleted of $Cl^-$ obtained in (c) is recirculated to (a).

3. The process of claim 1, wherein a liquid melt comprising copper ions $Cu^{n+}$, alkali cations and chloride ions $Cl^-$ with n being a number in the range from 1.5 to 2.0, is used as initial liquid melt at the start of the process and the process is started in step (c).

4. The process of claim 1, wherein the liquid melt comprising copper ions $Cu^{n+}$, alkali cations and chloride ions $Cl^-$ comprises as alkali cations one or more alkali cation(s) selected from the group of lithium cation, sodium cation and potassium cation.

5. The process of claim 4, wherein the one or more alkali cations comprise potassium cations.

6. The process of claim 4, wherein the liquid melt comprises $Cu^{n+}$, potassium ions $K^+$ and chloride ions $Cl^-$ and is obtained or obtainable from a salt mixture having a molar ratio $Cu^{n+}:K^+$ in the range from 1:0.60 to 1:1.45.

7. The process of claim 6, wherein the salt mixture comprises $Cu(II)Cl_2$ and KCl.

8. The process of claim 1, wherein (a), (b) and (c) are conducted in batch mode or continuously.

* * * * *